United States Patent [19]

Baba et al.

[11] 4,433,110
[45] Feb. 21, 1984

[54] PROCESS FOR PRODUCING PROPYLENE BLOCK COPOLYMERS

[75] Inventors: Kazuo Baba; Shyozo Kawamata, both of Chiba; Yoshiharu Fukui, Ehime; Seiichiro Ima, Ehime; Tatsuya Miyatake, Ehime, all of Japan

[73] Assignee: Sumitomo Chemical Company, Limited, Osaka, Japan

[21] Appl. No.: 255,005

[22] Filed: Apr. 17, 1981

[30] Foreign Application Priority Data

Apr. 21, 1980 [JP] Japan .................................. 55-53450
May 26, 1980 [JP] Japan .................................. 55-70451

[51] Int. Cl.$^3$ ............................................ C08F 297/08
[52] U.S. Cl. ............................................ 525/323; 525/53; 525/247; 525/321; 526/348; 526/348.6; 526/916
[58] Field of Search ........................ 525/321, 323, 247

[56] References Cited

U.S. PATENT DOCUMENTS

| | | | |
|---|---|---|---|
| 3,970,719 | 7/1976 | Edmonds | 525/321 |
| 4,039,632 | 8/1977 | Edmonds | 525/323 |
| 4,161,574 | 7/1979 | Strametz et al. | 526/159 |
| 4,308,357 | 12/1981 | Kaus et al. | 525/323 |
| 4,334,040 | 6/1982 | Fujii et al. | 525/323 |

FOREIGN PATENT DOCUMENTS

| | | |
|---|---|---|
| 990717 | 4/1965 | United Kingdom . |
| 1318553 | 5/1973 | United Kingdom . |
| 1328102 | 8/1973 | United Kingdom . |
| 2061296 | 5/1981 | United Kingdom . |

OTHER PUBLICATIONS

Japanese Pat. Pub. No. 22052/1962, translated claim.
Japanese Pat. App. No. 46598/76, summary.
Japanese Pat. App. No. 35487/74, summary.

*Primary Examiner*—Stanford M. Levin
*Attorney, Agent, or Firm*—Sughrue, Mion, Zinn, Macpeak, and Seas

[57] ABSTRACT

A propylene block copolymer produced by polymerizing propylene, ethylene and an $\alpha$-olefin having 4 to 8 carbon atoms in two stages with a Zieglar-Natta catalyst by a process which comprises (A) supplying propylene and ethylene in the first stage and propylene and the $\alpha$-olefin in the second stage, or (B) supplying propylene and the $\alpha$-olefin in the first stage and propylene and ethylene in the second stage, to the polymerization system, wherein the amounts of propylene and ethylene supplied in the first stage of (A) or in the second stage of (B) are 90 to 99 wt % and 10 to 1 wt % based on the total amount of propylene and ethylene supplied in the first stage of (A) or in the second stage of (B), respectively, the amounts of propylene and the $\alpha$-olefin supplied in the second stage of (A) or in the first stage of (B) are 60 to 98 wt % and 40 to 2 wt % based on the total amount of propylene and the $\alpha$-olefin supplied in the second stage of (A) or in the first stage of (B), respectively, and the amounts of copolymers formed in the first and second stages are 20 to 90 wt % and 80 to 10 wt % based on the final block copolymer, respectively.

5 Claims, 1 Drawing Figure

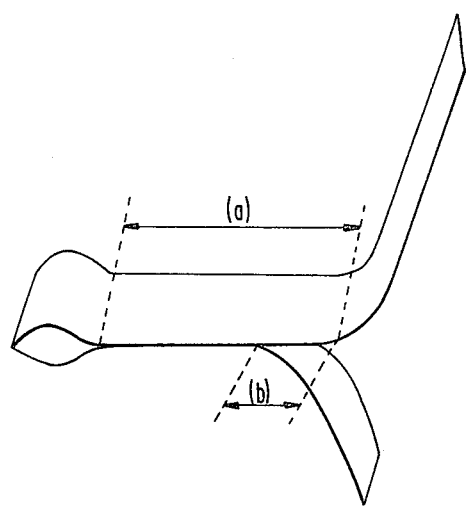

PROCESS FOR PRODUCING PROPYLENE BLOCK COPOLYMERS

FIELD OF THE INVENTION

This invention relates to a process for producing propylene block copolymers of improved hot tack property in an industrially advantageous manner. More particularly, it relates to an economical and industrially advantageous process for producing propylene block copolymers having improved hot tack property and heat sealing property, transparency, stiffness, slipperiness, blocking property and other properties required of a propylene copolymer film.

BACKGROUND OF THE INVENTION

Isotactic polypropylene produced by using a stereoregular catalyst is widely used as a material from which various shaped articles are made because of its high stiffness, strength, moldability, and heat resistance, and because it provides a shaped article having good appearance. A polypropylene film is highly evaluated for its transparency and stiffness and is currently used as a packaging material for various objects.

One defect of the polypropylene is its low low-temperature resistance, i.e., its impact strength depends upon temperature so greatly that the impact strength is greatly reduced from room temperature to 0° C. Another defect is that the temperature at which a polypropylene film can be heat-sealed or at which a stretched film contracts is so high that, if, for example, a biaxially stretched film is heat-sealed at a temperature which adequate heat sealing can be achieved, the film contracts with heat and its appearance is impaired. Therefore, the heat sealing of a polypropylene film is practically impossible. The hot tack property is one of the most important requirements that films must satisfy. Many types of film are used to pack a wide variety of objects such as foods (e.g., potato chips, rice crackers, biscuits, sugar, rice, wheat, wheat flour and other cereals), as well as industrial products (e.g., bolts, nuts, nails and screws). Since the heat-sealed edges of the packaging film are placed under the weight of the contents before the edges are cooled adequately, it often occurs that the edges break or a pinhole is found to be formed therein. This means a film having good heat sealing property is not suitable for practical use unless its hot tack property is also good.

In order to overcome these defects of polypropylene, propylene random copolymers such as propylene-ethylene copolymer, propylene-butene-1 copolymer and propylene-ethylene-butene-1 copolymer have been produced by copolymerizing propylene with a small amount of ethylene and α-olefins such as butene-1. These copolymers either alone or in combination with other resins or rubber are used in the heat-sealable layer of a biaxially stretched polypropylene film, a shrink-pack film, or a low-temperature resistant polypropylene film. These propylene copolymers are generally produced by slurry polymerization using an inert solvent such as hexane or heptane (such polymerization being hereunder referred to as "solvent polymerization"). However, in many cases, this method of polymerization produces a valueless amorphous polymer which dissolves in the solvent, and causes a great loss in the monomers which is economically disadvantageous. Furthermore, an increase in the viscosity of the slurry requires more power to achieve the same degree of agitation and the efficiency of heat transfer in the polymerization vessel is decreased, and all these phenomena reduce the productivity of the solvent polymerization. These defects are particularly conspicuous when a propylene copolymer of increased comonomer content (e.g., ethylene and an α-olefin such as butene-1) having improved hot tack property and heat sealing property is to be produced by the solvent polymerization.

The prior art propylene copolymers have serious defects in physical properties. The propylene-ethylene copolymer does not have satisfactory heat sealing property, stiffness, slipperiness and blocking property. The propylene-α-olefin (e.g., butene-1) copolymer is very low in hot tack property, and its low-temperature resistance, i.e., impact strength at low temperature, is poor. The propylene-ethylene-butene-1 copolymer has somewhat improved heat sealing property but is low in hot tack property and stiffness, and the balance of the physical properties in processing into a film of the copolymer is far from being satisfactory. A block copolymer of propylene or ethylene or an α-olefin is known and has improved low-temperature resistance without undergoing much decrease in stiffness. But, such block copolymer is poor in transparency, and in particular, the transparency of a film of the copolymer is extremely low and no reduction in the temperature at which the film can be heat-sealed is achieved.

In view of the above, there has not yet been found a propylene copolymer which has improved hot tack property and heat-sealing property as well as a good balance of the other physical properties and which can be produced consistently on an industrial scale.

SUMMARY OF THE INVENTION

As a result of extensive studies for overcoming the defects of propylene copolymers in production as well as physical properties, this invention was achieved.

An object of this invention is, therefore, to provide a process for producing a propylene block copolymer by polymerizing propylene, ethylene and an α-olefin having 4 to 8 carbon atoms in two stages with a Ziegler-Natta catalyst, which comprises (A) supplying propylene and ethylene in the first stage and propylene and the α-olefin in the second stage, or (B) supplying propylene and the α-olefin in the first stage and propylene and ethylene in the second stage, to the polymerization system, wherein the amounts of propylene and ethylene supplied in the first stage of (A) or in the second stage of (B) are 90 to 99 wt% and 10 to 1 wt% based on the total amount of propylene and ethylene supplied in the first stage of (A) or in the second stage of (B), respectively, the amounts of propylene and the α-olefin supplied in the second stage of (A) or in the first stage of (B) are 60 to 98 wt% and 40 to 2 wt% based on the total amount of propylene and the α-olefin supplied in the second stage of (A) or in the first stage of (B), respectively, and the amounts of copolymers formed in the first and second stages are 20 to 90 wt% and 80 to 10 wt% based on the final block copolymer, respectively.

The process of this invention provides a propylene block copolymer having particularly good hot tack property and heat sealing property as well as improved stiffness, transparency, slipperiness and blocking property. According to this process, the formation of an entirely useless amorphous polymer that dissolves in the polymerization solvent can be minimized while enhancing greatly the yield of a highly crystalline propylene block copolymer product.

BRIEF DESCRIPTION OF THE DRAWING

The FIGURE shows the measurement of hot tack property, in which (a) is a sheet width (20 mm) and (b) a peel length, respectively.

DETAILED DESCRIPTION OF THE INVENTION

The catalyst which is to be used in the production of a propylene block copolymer in this invention is a so-called "Ziegler-Natta catalyst", which, as well known, consists essentially of an organometallic compound of Groups I to III of the Periodic Table and a transition metal compound of Groups IV to VIII of the Periodic Table. Such Ziegler-Natta catalysts and variations thereof are well known in the art. Suitable examples of the transition metal compound which can be used include a titanium compound, particularly, a halogenated titanium compound. In many cases, the titanium compound is supported on a suitable carrier and then used. Illustrative halogenated titanium compounds include titanium tetrahalides such as titanium tetrachloride, titanium tetrabromide and titanium tetraiodide, and low-valency titanium halides such as titanium trichloride, titanium tribromide, titanium triiodide and titanium dichloride. Of these compounds, titanium tetrachloride and titanium trichloride are particularly preferred.

Titanium trichloride can be prepared by many known methods: (1) titanium tetrachloride is reduced with hydrogen, metallic aluminum, metallic titanium or organometallic aluminum; (2) the product of (1) is subjected to heat treatment or grinding by ball-milling or the like; (3) the same as method (2) except that it is performed in the presence of an ether compound, a ketone or other various compounds; (4) titanium trichloride obtained by reduction is treated with a complexing agent such as an ether compound; (5) the titanium trichloride from (4) is further treated with a halogen compound such as a halogen, an organic halogen compound or a titanium tetrahalide; (6) the treatment with a complexing agent is performed simultaneously with the treatment with a halogen compound; and (7) reduction with an organoaluminum compound is performed simultaneously with the treatment with a complexing agent and a halogen compound. Of these, the titanium trichloride prepared by reducing titanium tetrachloride with metallic aluminum followed by grinding, or one prepared by reducing titanium tetrachloride with an organoaluminum compound is used with advantage. The titanium trichloride catalysts described in U.S. Pat. No. 4,210,738, Japanese Patent Application (OPI) No. 46598/76, (the term "OPI" as used herein refers to a "published unexamined Japanese patent application") U.S. Pat. Nos. 4,182,691, 4,165,298 and 4,243,786 are particularly preferred because they have high activity and can produce the desired propylene block copolymer in high yield.

Compositions made of tetra- or trivalent titanium halides and inorganic solid particles (e.g., $MgCl_2$, $Mg(OH)Cl$, $SiO_2$ and $Al_2O_3$) which may or may not be treated with a Lewis base can also be used. These compositions may be milled or treated with various modifiers such as a metal halide, a halogenated hydrocarbon, an alkylene oxide, an ether, an ester, a ketone, an amine and a phosphorus compound, and the so treated compositions are used with advantage. These catalysts can be prepared by various methods, for example, those which are described in U.S. Pat. Nos. 4,107,415, 4,085,276, 4,226,741, 4,149,990 and 4,277,589, 4,220,554, 4,159,256 and 4,159,963, and 4,235,984, and catalysts which comprise a carrier having supported thereon the titanium tetrachloride produced by the methods described in these references are preferred.

Known examples of the organometallic compound of Groups I to III of the Periodic Table are those of beryllium, magnesium and aluminum with the aluminum compounds being preferred. As the organoaluminum compound which can be used, a compound of the formula, $AlR_nX_{3-n}$ (wherein R is a hydrocarbon group, X is a halogen atom, a hydrogen atom or an alkoxy group, and n is a number of from 1 to 3) is suitable. When the transition metal compound component is titanium tetrachloride or a carrier-supported catalyst, an organoaluminum compound of the above-described formula wherein n is 2 or 3, such as, for example, triethyl aluminum or triisobutyl aluminum, is suitable. When the transition metal compound component is titanium trichloride, an organoaluminum compound of the above-described formula wherein n is 1 to 3, such as, for example, diethylaluminum chloride, ethylaluminum sesquichloride or triethyl aluminum, is suitable.

The catalyst system made of the transition metal compound and organometallic compound may further contain a third component which is added to the reaction system during the polymerization. Suitable examples of the third component which can be used include a Lewis base such as an ether, a thioether, an ester, a cyclic ester, a phosphine, a phospite, a phosphate, a ketone and an amine.

In the stage of feed of propylene and ethylene according to this invention, 90 to 99 wt%, preferably 94 to 98 wt%, of propylene and 1 to 10 wt%, preferably 2 to 6 wt%, of ethylene are supplied. If the amount of ethylene supplied is less than 1 wt%, the temperature at which a film of the final copolymer product can be heat-sealed is not as low as desired. If the amount of ethylene exceeds 10 wt%, an increasing amount of the resulting copolymer dissolves in the polymerization solvent to reduce the yield of the crystalline copolymer greatly. Furthermore, a film of the copolymer product is poor in blocking property.

In the stage of feed of propylene and an α-olefin having 4 to 8 carbon atoms according to this invention, 60 to 98 wt%, preferably 70 to 97 wt%, of propylene and 2 to 40 wt%, preferably 3 to 30 wt%, of the α-olefin are supplied. If the amount of the α-olefin having 4 to 8 carbon atoms supplied is less than 2 wt%, the physical properties of the resulting copolymer are not so improved, and, on the other hand, if the amount of the α-olefin exceeds 40 wt%, the yield of the crystalline copolymer is greatly reduced and a film of the copolymer product is very low in blocking property and transparency.

In the first stage of copolymerization, 20 to 90 wt%, preferably 30 to 80 wt%, of the amount of the final block copolymer to be produced in the process of this invention is formed. If the amount of the copolymer formed in the first stage exceeds 90 wt%, one of the intended objects of this invention, i.e., increased overall yield of the crystalline copolymer that does not dissolve in the polymerization solvent, cannot be achieved, and if the amount of the copolymer formed in the first stage is less than 20 wt%, another object of this invention, i.e., improved physical properties due to the copolymer produced in the second stage, cannot be expected.

In the second stage of copolymerization, 10 to 80 wt%, preferably 20 to 70 wt%, of the amount of the final block copolymer to be produced in the process of this invention is formed. If the amount of the copolymer formed in the second stage exceeds 80 wt%, one object of this invention, i.e., improved physical properties due to the copolymer formed in the second stage, cannot be achieved to the desired extent, and if the amount of the copolymer formed in the second stage is less than 10 wt%, the overall yield of the crystalline copolymer is reduced.

The catalyst according to this invention may be modified to achieve an even higher yield of the crystalline copolymer, and one means to do this is by feeding propylene, ethylene or the α-olefin independently in the very beginning of polymerization in an amount such that the properties of the copolymer to be finally obtained are not adversely affected, for instance, less than 10 g per gram of the transition metal compound catalyst used, or in an amount to give less than 1 wt% of a homopolymer based on the total amount of the copolymer produced.

The propylene block copolymer produced according to this invention preferably consists of 74.0 to 99.7 wt% of a propylene unit, 0.2 to 18 wt% of an α-olefin unit and 0.1 to 8 wt% of an ethylene unit, and particularly preferably consists of 80 to 99.0 wt% of a propylene unit, 0.5 to 15.0 wt% of an α-olefin unit and 0.5 to 5 wt% of an ethylene unit.

The process of this invention can be performed under any suitable conditions for polymerization. In other words, polymerization can be performed in the presence of an inert hydrocarbon such as an aliphatic hydrocarbon (e.g., butane, pentane, hexane or heptane), an alicyclic hydrocarbon (e.g., cyclohexane or methyl cyclohexane), an aromatic hydrocarbon (e.g., benzene, toluene or xylene) or a mixture thereof, or the monomers per se may be used as a polymerization solvent. Alternatively, polymerization may be performed in a medium composed of the monomers in a gaseous state. The respective monomers may be supplied to the reaction system either continuously or in divided portions under the condition that the monomers supplied in the first and second stages of copolymerization be such that a copolymer having a substantially random composition will be provided.

Suitable examples of the α-olefin having 4 to 8 carbon atoms which can be used include butene-1, pentene-1, hexene-1, 4-methylpentene-1, heptene-1 and octene-1, and two or more of these α-olefins may be used in combination.

The reaction according to this invention is preferably carried out in the presence of hydrogen as a molecular weight controller. The amount of hydrogen supplied is determined depending upon the use of the propylene block copolymer as a product. The proportion of the amount of hydrogen supplied in the first stage of copolymerization to that of hydrogen supplied in the second stage varies depending upon the polymerization conditions and the molecular weight of the copolymer desired, and, therefore, it should be properly controlled depending upon these parameters. Usually, each stage of copolymerization is conducted at a hydrogen concentration in the polymerization gaseous phase of from 0.1 to 15 vol% exclusive of the partial vapor pressure of the inert solvent.

The polymerization conditions for the first and second stages of copolymerization may be the same or different, and usually, the polymerization temperature is in the range of from 30° to 90° C., preferably from 45° to 80° C., and the polymerization pressure is in the range of from approximately atmospheric pressure to 100 kg/cm$^2$G. The amount of the catalyst components, (A) the transition metal compound and (B) the organometallic compound, need not limited to be particular ranges, and the component (B) is used with advantage in such an amount that the concentration in the polymerization vessel is from 1 to 100 mmol/liter. Polymerization according to this invention may be performed with one or more polymerization vessels, with each stage of copolymerization being carried out either in a batchwise process or continuous process.

The propylene block copolymer produced in this invention is useful as a material for forming not only films as described below but also injection molded articles, etc.

This invention is now described in greater detail by reference to the following examples and comparative examples which are given here for illustrative purposes only and are by no means intended to limit the scope of this invention. The copolymer and film properties reported in the examples were measured as follows:

(1) Yield of polymer powder $$\text{Yield of polymer powder} = \frac{\text{weight of portion insoluble in polymerization solvent}}{\text{(weight of portion insoluble in polymerization solvent)} + \text{(weight of portion soluble in polymerization solvent)}} \times 100$$

(2) Melt index (MI)

Measurement was carried out in accordance with JIS K6758.

(3) Heat sealing temperature

Using a heat sealer, a test sample (25 mm in width) was prepared by pressing a layer of pieces of the same film under a weight of 2 kg/cm$^2$ at a given temperature for 2 seconds. A peeling test was conducted at a peeling rate of 200 mm/min and a peeling angle of 180°, and the temperature at which peeling resistance was 300 g/25 mm was taken as heat sealing temperature.

(4) Hot tack property

A modification of a heat sealer produced by Toyo Seiki K.K. was used for measurement. A film having a width of 25 mm and a length of 300 mm was fixed at the upper end and placed under a weight of 35 g at the lower end. The film was folded into two, and the edges 20 mm wide were pressed with a heat sealer for 0.5 second under a load of 1 kg/cm$^2$ at a given temperature, and the length (in mm) by which the edges came apart under a given peeling weight was measured. (See FIG. 1.)

(5) Transparency (haze)

A test was carried out in accordance with ASTM D1003.

(6) Blocking

A blocked sample was prepared at 60° C. for 3 hours under a weight of 40 g/cm$^2$, and measured for blocking on a blocking tester (produced by Shimazu Seisakusho, Ltd.).

(7) Stiffness

Measurement was carried out in accordance with ASTM D747.

Evaluation of haze, heat sealing temperature, hot tack property and blocking was made with a film 30 microns thick that was prepared by pelletizing a copolymer powder having incorporated therein an anti-oxidant, an anti-blocking agent and a lubricant using a granulator, followed by making a film using a T-die extruder.

EXAMPLE 1

(1) Preparation I (Preparation of Reduction Product)

After replacing the atmosphere in a 5-liter reactor with argon, dry hexane (1 liter) and titanium tetrachloride (250 ml) were added thereto and the mixed solution was kept at −5° C. A solution comprising dry hexane (750 ml) and ethylaluminum sesquichloride (580 ml) was added dropwise thereto so that the reaction system was kept at −3° C. or less. Thereafter, stirring was continued at this temperature for 2 hours. After the reaction was finished, the reaction system was allowed to stand, and the reduction product was separated at 0° C. from the liquid portion and washed twice with hexane (1 l). Thus, 400 g of the reduction product was obtained.

(2) Preparation II

The reduction product obtained in Preparation I was slurried in n-decalin, and the slurry concentration was adjusted to 0.2 g/cc, followed by heat treatment at 140° C. for 2 hours. After the reaction was finished, the supernatant liquid was discharged and the product was washed twice with hexane (1 l) to obtain a titanium trichloride composition (A).

(3) Preparation III 400 g of the titanium trichloride composition (A) prepared in Preparation II was slurried in toluene (2 l), and iodine and diisoamyl ether were added thereto so that the molar ratio of titanium trichloride composition (A) to $I_2$ to diisoamyl ether was 1:0.1:1.0. The reaction was carried out at 80° C. for 1 hour to obtain a titanium trichloride solid catalyst (B).

(4) Production of Propylene Block Copolymer

After the atmosphere in a 200-liter polymerization vessel was replaced with nitrogen, purified n-heptane (100 l), the titanium trichloride solid catalyst (B) obtained in Preparation III (8.0 g) and diethylaluminum chloride (50 g) were added thereto, and the contents were heated to 50° C. The vessel was supplied with a gaseous mixture of propylene and ethylene in the presence of hydrogen, and the first stage of polymerization was conducted at a constant pressure in the vessel so that 10 kg of a copolymer was produced. Subsequently, the polymerization vessel was supplied with a gaseous mixture of propylene and butene-1, and the second stage of polymerization was conducted at a constant pressure in the vessel so that 10 kg of a copolymer was produced. After completion of the polymerization, the resulting copolymer was separated from the solvent and dried to obtain a propylene block copolymer. Details of the polymerization conditions and the result of polymerization are set forth in Table 1, and the physical properties of the thus-obtained propylene block copolymer in Table 2.

EXAMPLE 2

A propylene block copolymer was produced by repeating the same procedure of Example 1 except that the proportions of propylene to ethylene and of propylene to butene-1, and the proportion of the copolymer formed in the first stage of polymerization to that of the copolymer formed in the second stage of polymerization were changed. Details of the polymerization conditions and the result of polymerization are set forth in Table 1, and the physical properties of the thus-produced propylene block copolymer in Table 2.

EXAMPLE 3

A propylene block copolymer was produced by repeating the same procedure of Example 1 except that the proportions of propylene to ethylene and of propylene to butene-1, and the proportion of the copolymer formed in the first stage of polymerization to that of the copolymer formed in the second stage of polymerization were changed. The other difference was that 5.2 g of methyl methacrylate was added to the polymerization vessel. Details of the polymerization conditions and the result of polymerization are set forth in Table 1, and the physical properties of the thus-produced propylene block copolymer in Table 2.

COMPARATIVE EXAMPLE 1

A propylene copolymer was produced by repeating the same procedure of Example 1 except that only propylene was supplied in the first stage of polymerization. Details of the polymerization conditions and the result of polymerization are set forth in Table 1, and the physical properties of the thus-produced copolymer in Table 2.

COMPARATIVE EXAMPLES 2 TO 4

Random copolymers of propylene-butene-1, propylene-ethylene, and propylene-ethylene-butene-1 were produced by repeating the same procedure of Example 1 except that no second stage of polymerization was conducted. Details of the polymerization conditions and the result of polymerization are set forth in Table 1, and the physical properties of the respective copolymers in Table 2.

EXAMPLES 4 & 5

Propylene block copolymers were produced by repeating the same procedure of Example 1 except that a $TiCl_3AA$ catalyst (produced by Toho Titanium Co., Ltd.) was used in place of the titanium trichloride solid catalyst (B). Details of the polymerization conditions and the result of polymerization are set forth in Table 1, and the physical properties of the respective copolymers in Table 2.

COMPARATIVE EXAMPLE 5

A random copolymer of propylene-ethylene-butene-1 was produced by repeating the same procedure of Example 1 except that no second stage of polymerization was conducted and that the $TiCl_3AA$ catalyst was used. Details of the polymerization conditions and the result of polymerization are set forth in Table 1, and the physical properties of the thus-produced copolymer in Table 2.

EXAMPLE 6

In this Example, a propylene block copolymer was produced by continuous polymerization in two 200-l polymerization vessels using the $TiCl_3AA$ catalyst. In the presence of hydrogen, the first polymerization vessel was supplied continuously with 4.7 g/hr or the TiCl- 3AA catalyst, 10 g/hr of diethylaluminum chloride, 20 l/hr of purified heptane, 5.5 kg/hr of propylene and 0.16 kg/hr of ethylene, and copolymerization was conducted at 50° C. The polymer slurry was discharged from the first vessel while the level of the liquid phase in that vessel was maintained constant. In the presence of hydrogen, the second polymerization vessel to which the polymer slurry was transferred from the first vessel was supplied continuously with 2.5 kg/hr of propylene and 0.52 kg/hr of butene-1, and copolymerization was conducted at 50° C. The polymer slurry was discharged from the second vessel while the level of the liquid phase in that vessel was maintained constant. In the procedures described above, propylene, ethylene and butene-1 were supplied to the second polymerization vessel in amounts indicated below: propylene=5.25 kg/hr (90.83 wt%), ethylene=0.01 kg/hr (0.17 wt%), and butene-1=0.52 kg/hr (9.0 wt%). The resulting propylene block copolymer had the following composition: 92.6 wt% propylene, 2.6 wt% ethylene, and 4.8 wt% butene-1. The proportion of the amount of the copolymer formed in the first polymerization vessel to that of the copolymer formed in the second vessel was 49:51. The physical properties of the resulting propylene block copolymer are shown in Table 2.

TABLE 1

| Example and Comparative Example Nos. | Composition of Gaseous Mixture Fed into 1st Stage of Polymerization | | | Composition of Gaseous Mixture Fed into 2nd Stage of Polymerization | | Proportion of Copolymer Formed in 1st Stage to Copolymer Formed in 2nd Stage | Yield of Polymer Powder (%) | Composition of Copolymer | | |
|---|---|---|---|---|---|---|---|---|---|---|
| | Propylene (wt %) | Ethylene (wt %) | Butene-1 (wt %) | Propylene (wt %) | Butene-1 (wt %) | | | Propylene (wt %) | Ethylene (wt %) | Butene-1 (wt %) |
| Example 1 | 97.0 | 3.0 | — | 90.4 | 9.6 | 60/40 | 97.2 | 94.7 | 1.8 | 3.6 |
| Example 2 | 95.3 | 4.7 | — | 94.0 | 6.0 | 40/60 | 95.2 | 94.6 | 2.0 | 3.4 |
| Example 3 | 95.9 | 4.3 | — | 91.5 | 8.5 | 50/50 | 96.0 | 93.9 | 2.1 | 4.0 |
| Example 4 | 97.2 | 2.8 | — | 80.0 | 20.0 | 60/40 | 92.2 | 91.9 | 1.6 | 6.5 |
| Example 5 | 96.6 | 3.4 | — | 89.0 | 11.0 | 70/30 | 94.6 | 94.5 | 2.3 | 3.2 |
| Comparative Example 1 | 100 | — | — | 90.0 | 10.0 | 50/50 | 95.0 | 96.0 | — | 4.0 |
| Comparative Example 2 | 88.0 | — | 12.0 | — | — | 100/0 | 93.1 | 92.1 | — | 7.9 |
| Comparative Example 3 | 95.8 | 4.2 | — | — | — | 100/0 | 92.6 | 95.9 | 4.1 | — |
| Comparative Example 4 | 88.9 | 2.3 | 8.8 | — | — | 100/0 | 93.4 | 92.6 | 2.1 | 5.3 |
| Comparative Example 5 | 84.8 | 1.8 | 10.5 | | | 100/0 | 89.8 | 92.7 | 1.7 | 5.8 |

TABLE 2

| Example and Comparative Example Nos. | MI (g/10 min) | Stiffness (kg/cm²) | Film Properties | | | | | | |
|---|---|---|---|---|---|---|---|---|---|
| | | | Haze (%) | Heat Sealing Temperature (°C.) | Blocking (g/100 cm²) | Peel Length (mm) Indicative of Hot Tack Property | | | |
| | | | | | | 115° C. | 120° C. | 125° C. | 130° C. |
| Example 1 | 7.2 | 9,600 | 3.4 | 124 | 25 | 20.0 | 13.8 | 4.9 | 2.4 |
| Example 2 | 7.0 | 9,300 | 3.2 | 123 | 30 | 20.0 | 12.6 | 3.8 | 1.9 |
| Example 3 | 6.9 | 9,000 | 3.3 | 122 | 32 | 20.0 | 12.5 | 3.5 | 1.3 |
| Example 4 | 7.1 | 7,700 | 3.0 | 114 | 44 | 20.0 | 5.1 | 2.1 | 1.2 |
| Example 5 | 7.0 | 9,200 | 3.3 | 123 | 33 | 20.0 | 13.4 | 4.0 | 2.2 |
| Example 6 | 7.2 | 8,400 | 3.1 | 119 | 40 | 20.0 | 9.5 | 3.2 | 1.1 |
| Comparative Example 1 | 7.0 | 10,200 | 4.6 | 133 | 26 | 20.0 | 20.0 | 18.0 | 8.5 |
| Comparative Example 2 | 7.2 | 8,100 | 4.4 | 127 | 38 | 20.0 | 20.0 | 10.0 | 4.1 |
| Comparative Example 3 | 7.1 | 6,900 | 3.5 | 126 | 80 | 20.0 | 19.0 | 8.1 | 2.0 |
| Comparative Example 4 | 6.9 | 7,300 | 3.7 | 124 | 53 | 20.0 | 18.5 | 7.8 | 2.2 |
| Comparative Example 5 | 7.3 | 7,000 | 3.8 | 125 | 62 | 20.0 | 18.9 | 8.5 | 2.3 |

EXAMPLE 7

After the atmosphere in a 200-liter polymerization vessel was replaced with nitrogen, 100 liters of purified heptane, 8.0 g of the titanium trichloride solid catalyst (B) obtained in Preparation III of Example 1 and 50 g of diethylaluminum chloride were added thereto, and the contents were heated to 50° C. The vessel was supplied with a gaseous mixture of propylene and butene-1 in the presence of hydrogen, and the first stage of polymerization was conducted at a constant pressure in the vessel so that 10 kg of a copolymer was produced. Subsequently, the polymerization vessel was supplied with a gaseous mixture of propylene and ethylene, and the second stage of polymerization was conducted at a constant pressure in the vessel so that 10 kg of a copolymer was produced. After completion of the polymerization, the resulting copolymer was separated from the solvent and dried to obtain a propylene block copolymer. Details of the polymerization conditions and the result of polymerization are set forth in Table 3, and the physical properties of the thus-obtained propylene block copolymer in Table 4.

EXAMPLE 8

A propylene block copolymer was produced by repeating the same procedure of Example 7 except that the proportions of propylene to butene-1 and of propylene to ethylene, and the proportion of the copolymer formed in the first stage of polymerization to that of the copolymer formed in the second stage of polymerization were changed. Details of the polymerization conditions and the result of polymerization are set forth in Table 3, and the physical properties of the thus-produced propylene block copolymer in Table 4.

EXAMPLE 9

A propylene block copolymer was produced by repeating the same procedure of Example 7 except that the proportions of propylene to butene-1 and of propylene to ethylene, and the proportion of the copolymer produced in the first stage of polymerization to that of the copolymer produced in the second stage of polymerization were changed. The other difference was that 5.2 g of methyl methacrylate was added into the polymerization vessel. Details of the polymerization conditions and the result of polymerization are set forth in Table 3, and the physical properties of the thus-produced propylene block copolymer in Table 4.

COMPARATIVE EXAMPLE 6

A propylene copolymer was produced by repeating the same procedure of Example 7 except that only propylene was supplied in the first stage of polymerization. Details of the polymerization conditions and the result of polymerization are set forth in Table 3, and the physical properties of the thus-produced copolymer in Table 4.

COMPARATIVE EXAMPLES 7 TO 12

Random copolymers of propylene-butene-1, propylene-ethylene, and propylene-ethylene-butene-1 were produced by repeating the same procedure of Example 7 except that no second stage of polymerization was conducted. Details of the polymerization conditions and the result of polymerization are set forth in Table 3, and the physical properties of the respective copolymers in Table 4.

EXAMPLES 10 TO 12

Propylene block copolymers were produced by repeating the procedure of Example 7 except that the TiCl$_3$AA catalyst was used in place of the titanium trichloride solid catalyst (B). Details of the polymerization conditions and the result of polymerization are set forth in Table 3, and the physical properties of the respective copolymers in Table 4.

EXAMPLE 13

In this Example, a propylene block copolymer was produced by continuous polymerization in two 200-l polymerizaton vessels using the TiCl$_3$AA catalyst. In the presence of hydrogen, the first polymerization vessel was supplied continuously with 4.7 g/hr of the TiCl$_3$AA catalyst, 10 g/hr of diethylaluminum chloride, 20 l/hr of purified heptane, 5.24 kg/hr of propylene, and 1 kg/hr of butene-1, and copolymerization was conducted at 50° C. The polymer slurry was discharged from the first polymerization vessel while the level of the liquid phase in that vessel was maintained constant. The composition of the slurry was as follows: propane = 2.48 kg/hr, and butene-1 = 0.76 kg/hr. In the presence of hydrogen, the second polymerization vessel to which the polymer slurry was transferred from the first vessel was supplied continuously with 2.64 kg/hr of propylene and 0.29 kg/hr of ethylene, and copolymerization was conducted at 50° C. The polymer slurry was discharged from the second vessel while the level of the liquid phase in that vessel was maintained constant. In the procedures described above, propylene, ethylene and butene-1 were supplied to the second polymerization vessel in amounts indicated below: propylene = 5.12 kg/hr (83.0 wt%), ethylene = 0.29 kg/hr (4.7 wt%), and butene-1 = 0.76 kg/hr (12.3 wt%).

The temperature and pressure in the first and second polymerization vessels were as follows:

|  | 1st Vessel | 2nd Vessel |
|---|---|---|
| Temperature | 60° C. | 60° C. |
| Pressure | 6 kg/cm$^2$G | 4 kg/cm$^2$G |

The resulting propylene block copolymer had the following composition: 91.2 wt% propylene, 3.7 wt% ethylene, and 5.1 wt% butene-1. The proportion of the amount of the copolymer formed in the first vessel to that of the copolymer formed in the second vessel was 42.9:57.1. The physical properties of the resulting block copolymer are shown in Table 4.

TABLE 3

| Example and Comparative Example Nos. | Composition of Gaseous Mixture Fed into 1st Stage of Polymerization | | | Composition of Gaseous Mixture Fed into 2nd Stage of Polymerization | | Proportion of Copolymer Formed in 1st Stage to Copolymer Formed in 2nd Stage | Yield of Polymer Powder (%) | Composition of Copolymer | | |
|---|---|---|---|---|---|---|---|---|---|---|
| | Propylene (wt %) | Butene-1 (wt %) | Ethylene (wt %) | Propylene (wt %) | Ethylene (wt %) | | | Propylene (wt %) | Butene-1 (wt %) | Ethylene (wt %) |
| Example 7 | 89.0 | 11.0 | — | 96.0 | 4.0 | 50/50 | 97.8 | 93.4 | 4.7 | 1.9 |
| Example 8 | 87.0 | 13.0 | — | 95.2 | 4.8 | 65/35 | 97.6 | 92.4 | 6.0 | 1.6 |
| Example 9 | 89.0 | 11.0 | — | 95.6 | 4.4 | 55/45 | 97.9 | 93.8 | 5.2 | 2.0 |
| Example 10 | 80.0 | 20.0 | — | 97.1 | 2.9 | 45/55 | 92.8 | 89.6 | 9.7 | 0.75 |
| Example 11 | 80.0 | 20.0 | — | 94.1 | 5.9 | 55/45 | 91.3 | 91.7 | 6.7 | 1.6 |
| Example 12 | 80.0 | 20.0 | — | 90.0 | 10.0 | 35/65 | 83.4 | 91.0 | 5.4 | 3.6 |
| Comparative Example 6 | 100.0 | — | — | 93.5 | 6.5 | 40/60 | 95.3 | 96.4 | — | 3.6 |
| Comparative | 90.0 | 10.0 | — | — | — | 100/0 | 97.6 | 92.4 | 7.6 | — |

TABLE 3-continued

| Example and Comparative Example Nos. | Composition of Gaseous Mixture Fed into 1st Stage of Polymerization | | | Composition of Gaseous Mixture Fed into 2nd Stage of Polymerization | | Proportion of Copolymer Formed in 1st Stage to Copolymer Formed in 2nd Stage | Yield of Polymer Powder (%) | Composition of Copolymer | | |
|---|---|---|---|---|---|---|---|---|---|---|
| | Propylene (wt %) | Butene-1 (wt %) | Ethylene (wt %) | Propylene (wt %) | Ethylene (wt %) | | | Propylene (wt %) | Butene-1 (wt %) | Ethylene (wt %) |
| Example 7 Comparative Example 8 | 95.7 | — | 4.3 | — | — | 100/0 | 92.5 | 96.0 | — | 4.1 |
| Comparative Example 9 | 89.6 | 8.8 | 2.0 | — | — | 100/0 | 96.2 | 92.5 | 5.6 | 1.9 |
| Comparative Example 10 | 85.3 | 8.9 | 3.7 | — | — | 100/0 | 82.1 | 91.2 | 5.3 | 3.5 |
| Comparative Example 11 | 84.8 | 13.5 | 1.7 | — | — | 100/0 | 89.1 | 91.9 | 6.5 | 1.6 |
| Comparative Example 12 | 79.1 | 20.0 | 0.9 | — | — | 100/0 | 90.5 | 89.4 | 9.8 | 0.8 |

TABLE 4

| Example and Comparative Example Nos. | MI (g/10 min) | Stiffness (kg/cm$^2$) | Film Properties | | | | | | |
|---|---|---|---|---|---|---|---|---|---|
| | | | Haze (%) | Heat Sealing Temperature (°C.) | Blocking (g/100 cm$^2$) | Peel Length (mm) Indicative of Hot Tack Property | | | |
| | | | | | | 115° C. | 120° C. | 125° C. | 130° C. |
| Example 7 | 7.0 | 8,600 | 3.3 | 122 | 33 | 20.0 | 12.4 | 3.5 | 1.2 |
| Example 8 | 7.3 | 8,700 | 3.4 | 121 | 30 | 20.0 | 11.7 | 3.3 | 1.2 |
| Example 9 | 7.1 | 8,500 | 3.4 | 121 | 26 | 20.0 | 10.5 | 3.0 | 1.1 |
| Example 10 | 6.8 | 7,900 | 3.8 | 119 | 47 | 20.0 | 10.4 | 3.1 | 1.2 |
| Example 11 | 7.0 | 8,300 | 3.6 | 121 | 46 | 20.0 | 11.5 | 3.2 | 1.1 |
| Example 12 | 7.1 | 7,600 | 4.0 | 116 | 55 | 20.0 | 5.0 | 2.0 | 1.1 |
| Example 13 | 7.1 | 7,700 | 3.9 | 115 | 56 | 20.0 | 5.1 | 2.2 | 1.1 |
| Comparative Example 6 | 7.1 | 7,500 | 7.9 | 128 | 80 | 20.0 | 20.0 | 15.0 | 5.0 |
| Comparative Example 7 | 7.2 | 8,700 | 3.3 | 126 | 28 | 20.0 | 20.0 | 10.2 | 4.3 |
| Comparative Example 8 | 7.5 | 6,800 | 4.4 | 124 | 78 | 20.0 | 19.0 | 7.7 | 1.8 |
| Comparative Example 9 | 7.0 | 7,800 | 3.4 | 122 | 45 | 20.0 | 13.5 | 6.2 | 2.0 |
| Comparative Example 10 | 7.1 | 6,900 | 5.0 | 118 | 110 | 20.0 | 13.0 | 6.0 | 1.9 |
| Comparative Example 11 | 7.2 | 7,200 | 4.7 | 124 | 85 | 20.0 | 19.0 | 8.0 | 2.0 |
| Comparative Example 12 | 7.0 | 7,100 | 4.6 | 123 | 80 | 20.0 | 18.0 | 7.5 | 1.8 |

While the invention has been described in detail and with reference to specific embodiments thereof, it will be apparent to one skilled in the art that various changes and modifications can be made therein without departing from the spirit and scope thereof.

What is claimed is:

1. A propylene block copolymer produced by polymerizing propylene, ethylene and 1-butene in two stages with a Ziegler-Natta catalyst by a process which comprises (A) supplying propylene and ethylene in the first stage and propylene and said 1-butene in the second stage, or (B) supplying propylene and said 1-butene in the first stage and propylene and ethylene in the second stage, to the polymerization system, wherein the amounts of propylene and ethylene supplied in the first stage of (A) or in the second stage of (B) are 90 to 99 wt% and 10 to 1 wt% based on the total amount of propylene and ethylene supplied in the first stage of (A) or in the second stage of (B), respectively, the amounts of propylene and said 1-butene supplied in the second stage of (A) or in the first stage of (B) are 60 to 98 wt% and 40 to 2 wt% based on the total amount of propylene and said 1-butene supplied in the second stage of (A) or in the first stage of (B), respectively, and the amounts of copolymers formed in the first and second stages are 20 to 90 wt% and 80 to 10 wt% based on the final block copolymer, respectively.

2. A block copolymer according to claim 1, wherein 94 to 98 wt% of propylene and 2 to 6 wt% of ethylene are supplied in the first stage of (A) or in the second stage of (B).

3. A block copolymer according to claim 1, wherein 70 to 97 wt% of propylene and 3 to 30 wt% of said 1-butene are supplied in the second stage of (A) or in the first stage of (B).

4. A block copolymer according to claim 1, wherein the amounts of copolymers formed in the first and second stages are 30 to 80 wt% and 20 to 70 wt% based on the final block copolymer, respectively.

5. A propylene block copolymer produced by polymerizing propylene, ethylene and 1-butene with a Ziegler-Natta catalyst by a process which comprises the steps of:

(a) supplying propylene and ethylene in the presence of a Ziegler-Natta catalyst in the amount of 90 to 99 weight percent propylene and 10 to 1 weight percent ethylene, and
(b) supplying propylene and 1-butene in the presence of a Ziegler-Natta catalyst in the amount of 60 to 98 weight percent propylene and 40 to 2 weight percent of said 1-butene, wherein said steps (a) and (b) may be performed in either order and wherein the copolymer produced in the first performed step is supplied to the second step and wherein the amounts of copolymer produced in the first and second steps are 20 to 90 weight percent and 80 to 10 weight percent, respectively, based on the final block copolymer.

* * * * *